(12) United States Patent
Sekita

(10) Patent No.: US 7,259,920 B2
(45) Date of Patent: Aug. 21, 2007

(54) ZOOM LENS AND IMAGE PICKUP APPARATUS HAVING THE SAME

(75) Inventor: Makoto Sekita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/419,418

(22) Filed: May 19, 2006

(65) Prior Publication Data

US 2006/0250700 A1 Nov. 9, 2006

Related U.S. Application Data

(62) Division of application No. 11/064,146, filed on Feb. 22, 2005.

(30) Foreign Application Priority Data

Feb. 23, 2004 (JP) ............................. 2004-046453

(51) Int. Cl.
*G02B 15/14* (2006.01)
(52) U.S. Cl. ...................................... 359/689; 359/683
(58) Field of Classification Search ................ 359/683, 359/689
See application file for complete search history.

(56) References Cited

U.S. PATENT DOCUMENTS

2003/0103157 A1* 6/2003 Watanabe et al. ........... 348/360
2006/0274169 A1* 12/2006 Watanabe et al. ......... 348/240.3

FOREIGN PATENT DOCUMENTS

| JP | 63-135913 | 6/1988 |
|---|---|---|
| JP | 03-288113 | 12/1991 |
| JP | 05-323190 | 12/1993 |
| JP | 06-40170 | 5/1994 |
| JP | 07-3507 | 1/1995 |
| JP | 07-174971 | 7/1995 |
| JP | 07-261083 | 10/1995 |
| JP | 2001-272602 | 10/2001 |
| JP | 2002-048975 | 2/2002 |
| JP | 2002-055278 | 2/2002 |
| JP | 2002-365545 | 12/2002 |
| JP | 2003-05072 | 1/2003 |
| JP | 2003-128261 | 5/2003 |
| JP | 2003-149555 | 5/2003 |
| JP | 2003-149556 | 5/2003 |

* cited by examiner

*Primary Examiner*—Ricky Mack
*Assistant Examiner*—William C Choi
(74) *Attorney, Agent, or Firm*—Morgan & Finnegan LLP

(57) ABSTRACT

The present invention has as its object to obtain a zoom lens having a high variable power ratio, and having high optical performance which can sufficiently cope with even the use, for example, of a solid state image pickup element having a wide angle of field. In a zoom lens having, in succession from an object side to an image side, a first lens unit L1 of negative optical power, a second lens unit L2 of positive optical power and a third lens unit L3 of positive optical power, wherein the interval between adjacent ones of the lens units is changed to thereby effect focusing, the first lens unit has a negative lens and a positive lens, the second lens unit has a positive lens and a negative lens, the third lens unit has a positive lens, and the object side and image side surfaces of the negative lens G11 of the first lens unit which is most adjacent to the object side are of an aspherical shape.

10 Claims, 7 Drawing Sheets

ZOOM LENS AND IMAGE PICKUP APPARATUS HAVING THE SAME

This application is a divisional of U.S. patent application Ser. No. 11/064,146 filed on Feb. 22, 2005 which claims priority benefit under 35 U.S.C. § 119 based on Japanese Patent Application No. 2004-046453 filed on Feb. 23, 2004, which are hereby incorporated by reference herein in their entirety as if fully set forth herein.

BACKGROUND OF THE INVENTION

1. Field of the Invention

This invention relates to a zoom lens suitable for a still camera, a video camera, a digital camera, etc., and an image pickup apparatus having the same.

2. Description of Related Art

Recently, with the higher function of an image pickup apparatus (camera) such as a video camera or a digital still camera using a solid state image pickup element, a lens system of a relatively great aperture ratio including a wide angle of field has been required for an optical system used therein.

In a camera of this kind, various optical members such as a low-pass filter and a color correcting filter are disposed between the rearmost portion of a lens and an image pickup element and therefore, a lens system having a relatively long back focal length is required for an optical system used therein.

Further, in the case of a color camera using an image pickup element for a color image, in order to avoid color shading, an optical system having a good image side telecentric characteristic is desired as an optical system used therein.

There have heretofore been proposed various two-unit zoom lenses of a so-called short zoom type having a wide angle of field which comprises two lens units, i.e., a first lens unit of negative optical power and a second lens unit of positive optical power, and effects a focal length change by changing the lens interval between the two lens units. In these optical systems of the short zoom type, the second lens unit of positive optical power is moved to thereby effect a focal length change, and the first lens unit of negative optical power is moved to thereby effect the correction of a fluctuation in the position of an image point resulting from the focal length change. In a lens construction comprising these two lens units, the zoom magnification is of the order of double.

Further, in order to have a double or higher variable power ratio, and yet arrange an entire lens into a compact shape, there has been proposed a so-called three-unit zoom lens in which a third lens unit of negative or positive optical power is disposed on the image side of a two-unit zoom lens and which effects the correction of various aberrations occurring with a higher magnification (for example, Japanese Patent Publication No. H07-3507 and Japanese Patent Publication No. H06-40170).

As the three-unit zoom lens, there is known a three-unit zoom lens system having a wide angle of field which has a long back focal length and satisfies a telecentric characteristic (for example, Japanese Patent Application Laid-open No. S63-135913 and Japanese Patent Application Laid-open No. H07-261083).

Also, in the three-unit zoom lens, there is known a zoom lens in which a first lens unit of negative optical power is made stationary and a second lens unit of positive optical power and a third lens unit of positive optical power are moved to thereby effect zooming (for example, Japanese Patent Application Laid-open No. H03-288113).

Also, in the three-unit zoom lens, there is known a three-unit zoom lens having a relatively small number of constituent lenses in which in case of zooming, all lens units are moved and a cemented lens is effectively used as a second lens unit to thereby correct chromatic aberration (for example, Japanese Patent Application Laid-open No. 2001-272602, Japanese Patent Application Laid-open No. 2003-128261, Japanese Patent Application Laid-open No. 2002-48975, Japanese Patent Application Laid-open No. 2003-5072, Japanese Patent Application Laid-open No. 2003-149555 and Japanese Patent Application Laid-open No. 2003-149556).

Also, in the three-unit zoom lens, there is known a three-unit zoom lens in which the object side surface and image side surface of a lens of negative optical power in a first lens unit are made into an aspherical shape to thereby aim at a further decrease in the number of constituent lenses (for example, Japanese Patent Application Laid-open No. H05-323190, Japanese Patent Application Laid-open No. H07-174971, Japanese Patent Application Laid-open No. 2002-55278 and Japanese Patent Application Laid-open No. 2002-365545).

A three-unit zoom lens designed for a 35 mm film photograph is too long in back focal length and not good in telecentric characteristic for an image pickup apparatus using a solid state image pickup element and therefore, it is difficult to intactly use in an image pickup apparatus.

On the other hand, in recent years, in order to make the compactness of a camera and the higher magnification of a zoom lens compatible, there has been widely used a zoom lens of a so-called flush barrel type in which during non-photographing, the interval between adjacent ones of the lens units is reduced to an interval differing from that in a photographing state to thereby reduce the amount of protrusion of the lens from a camera main body.

Generally, if the number lenses of each lens unit constituting a zoom lens is great, the length of each lens unit on the optical axis thereof becomes great, and if the amount of movement of each lens unit in zooming and focusing is great, the full length of the lens becomes great and a desired flush barrel length cannot become achieved, and this becomes difficult to use in the zoom lens of the flush barrel type.

SUMMARY OF THE INVENTION

The present invention has as its object the provision of a compact zoom lens which has a small number of constituent lenses and has excellent optical performance, and an image pickup apparatus having the same.

The zoom lens of the present invention is a zoom lens having, in succession from an object side to an image side, a first lens unit of negative optical power, a second lens unit of positive optical power and a third lens unit of positive optical power, and effecting zooming with the interval between adjacent ones of the lens units changed, and is characterized in that the first lens unit has a negative lens G11 and a positive lens, and the object side and image side surfaces of the negative lens G11 are of an aspherical shape.

In a zoom lens having, in succession from the object side to the image side, a first lens unit of negative optical power, a second lens unit of positive optical power and a third lens unit of positive optical power, and effecting zooming with the interval between adjacent ones of the lens units changed, each of the lens G11 of the first lens unit which is most adjacent to the object side and the lens G21 of the second lens unit which is most adjacent to the object side is such that the object side or/and image side surfaces thereof are of an aspherical shape, and when the refractive indices of the materials of the lens G11 and the lens G21 are defined as n1n and n2p, respectively, the conditions that $1.85 < n1n$
$1.85 < n2p$ are satisfies.

According to the present invention, there are obtained a compact zoom lens having a small number of constituent lenses and having excellent optical performance, and an image pickup apparatus having the same.

Other various forms of the present invention will becomes apparent in some embodiments which will be described later.

DETAILED DESCRIPTION OF THE PREFERRED EMBODIMENTS

Embodiment 1

Description will hereinafter be made of some embodiments of the zoom lens of the present invention and an image pickup apparatus having the same.

Figure 1:
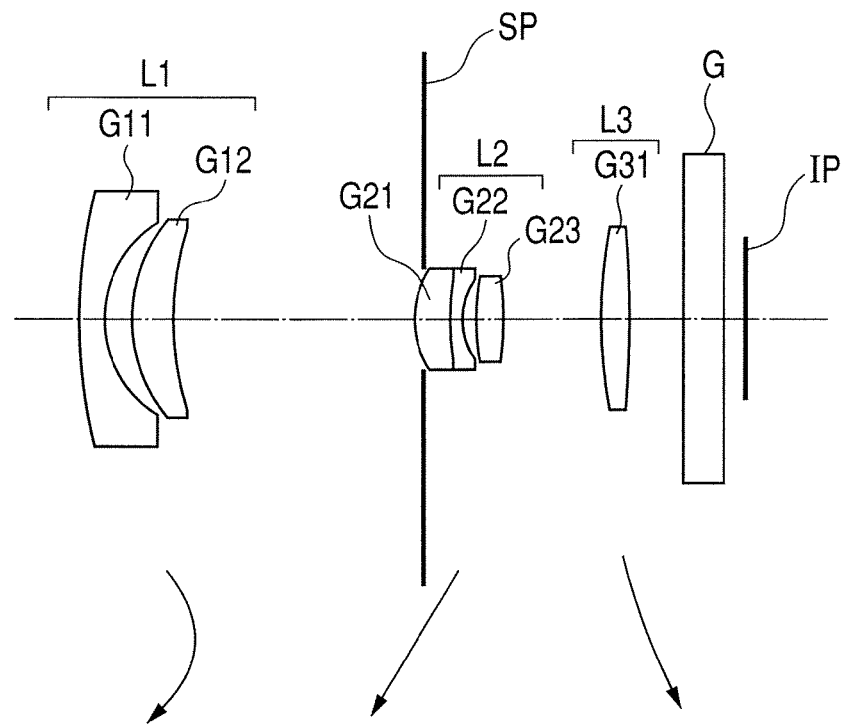
FIG. 1 is an optical cross-sectional view of a zoom lens according to Embodiment 1.
Figure 2:
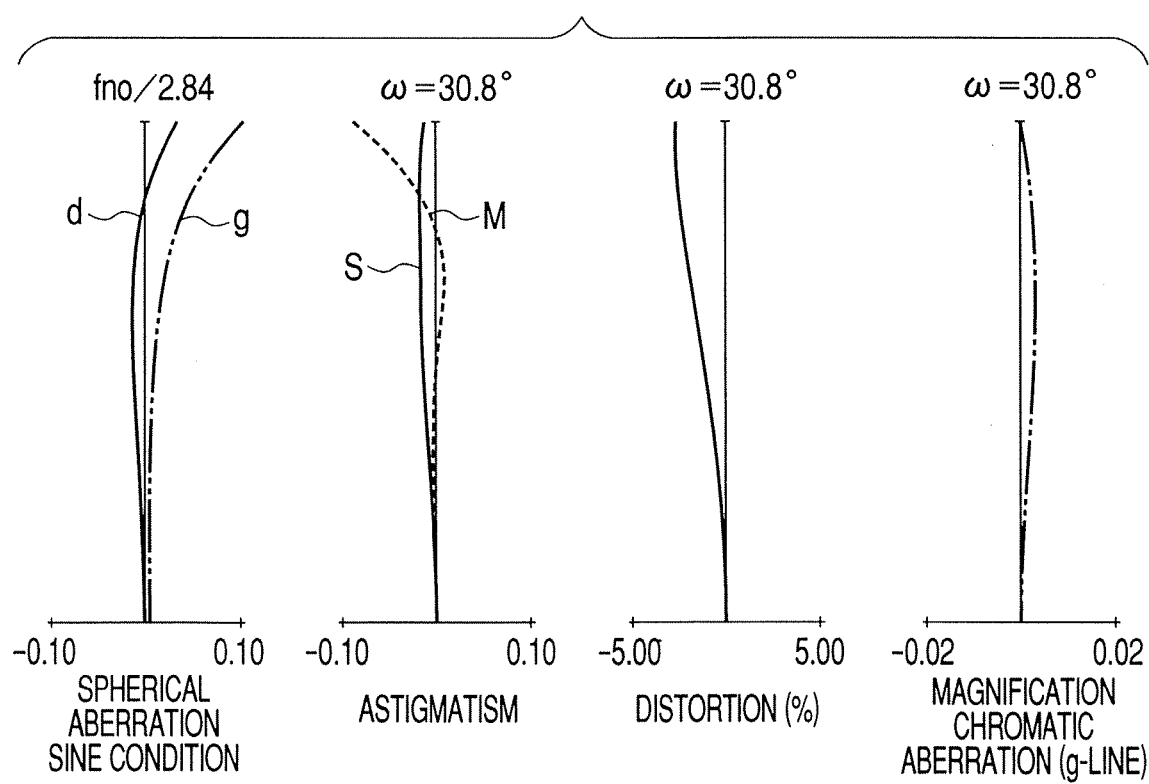
FIG. 2 shows the aberrations of the zoom lens according to Embodiment 1 at a wide angle end.
Figure 3:
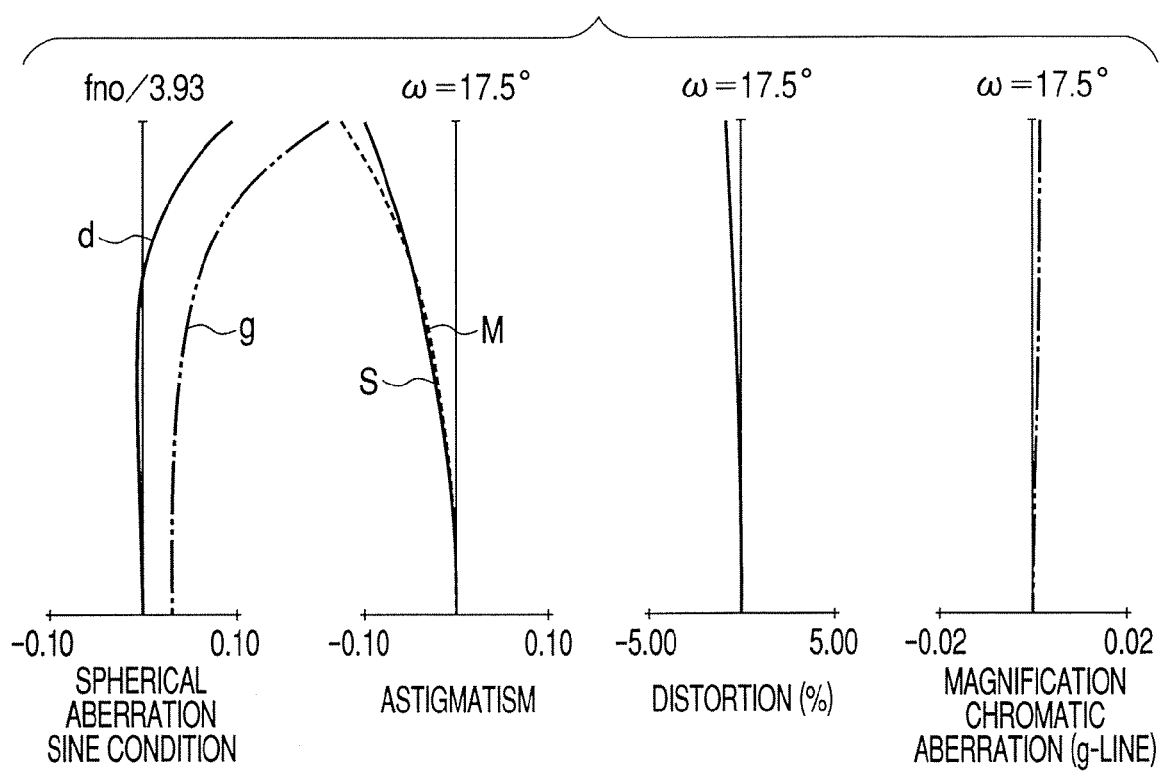
FIG. 3 shows the aberrations of the zoom lens according to Embodiment 1 at an intermediate zoom position.
Figure 4:
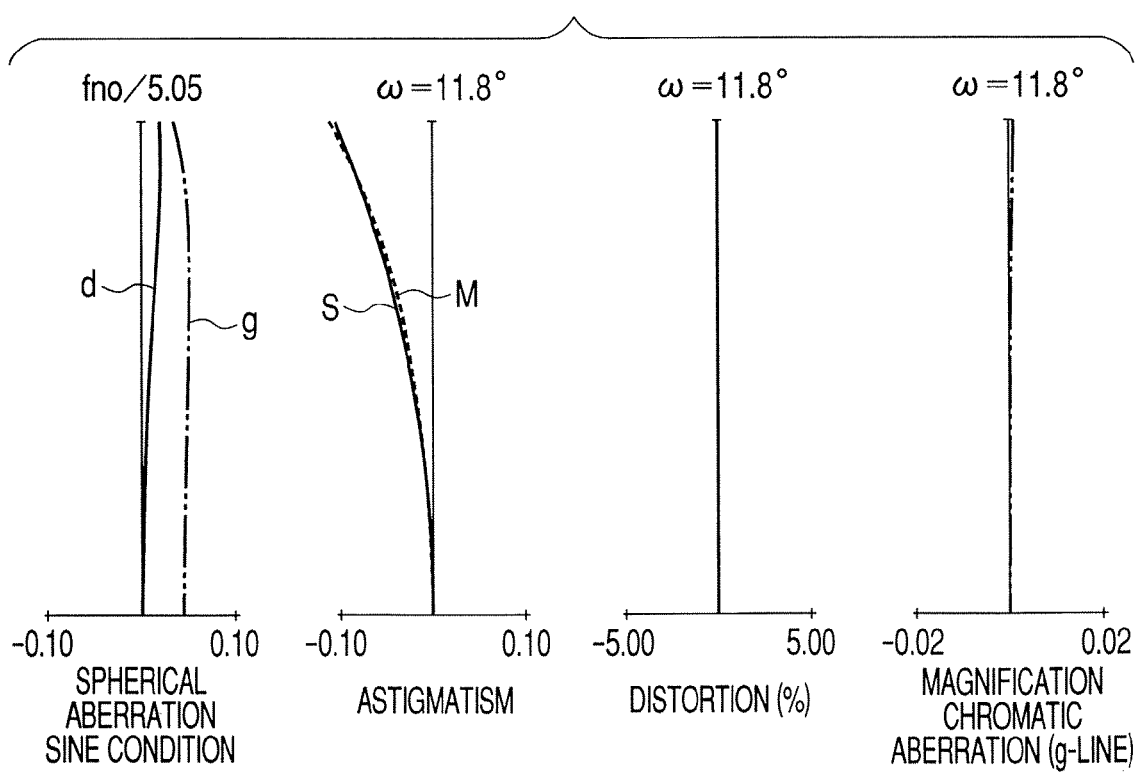
FIG. 4 shows the aberrations of the zoom lens according to Embodiment 1 at a telephoto end.

FIG. 1 is a lens cross-sectional view of a zoom lens according to Embodiment 1 of the present invention at the wide angle end (short focal length end), and FIGS. 2, 3 and 4 show the aberrations of the zoom lens according to Embodiment 1 at the wide angle end, the intermediate zoom position and the telephoto end (long focal length end), respectively. Embodiment 1 is a zoom lens of a variable power ratio of 2.9 and an aperture ratio of the order of 2.8-5.1.

Figure 5:
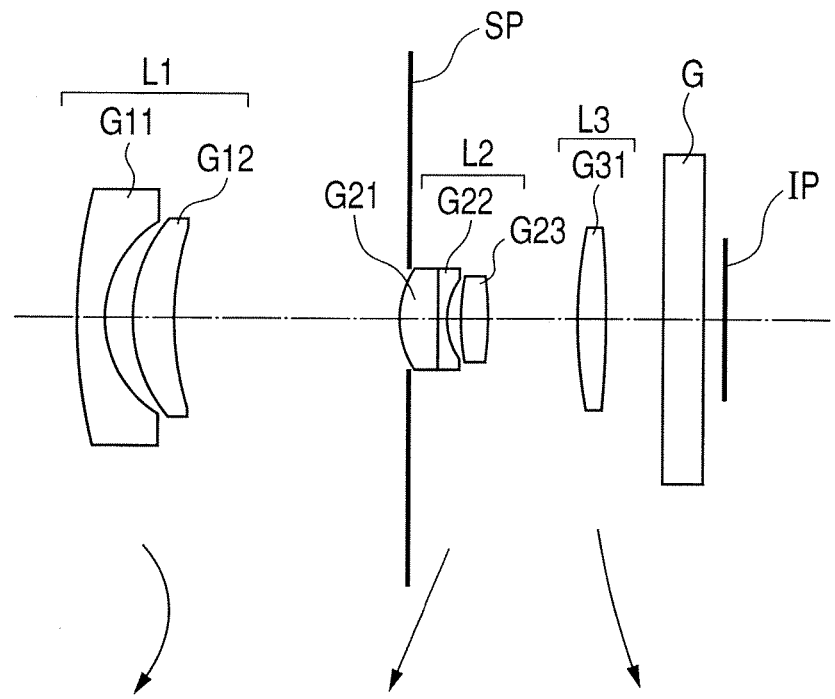
FIG. 5 is an optical cross-sectional view of a zoom lens according to Embodiment 1.
Figure 6:
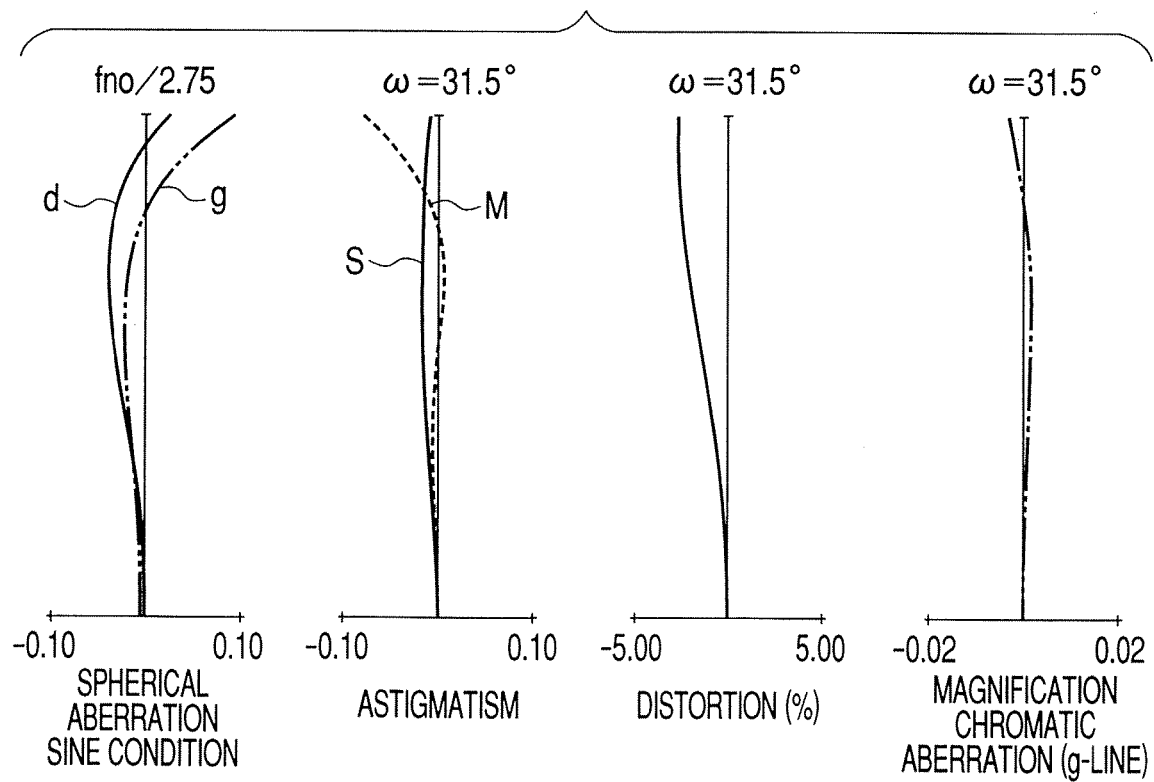
FIG. 6 shows the aberrations of the zoom lens according to Embodiment 2 at the wide angle end.
Figure 7:
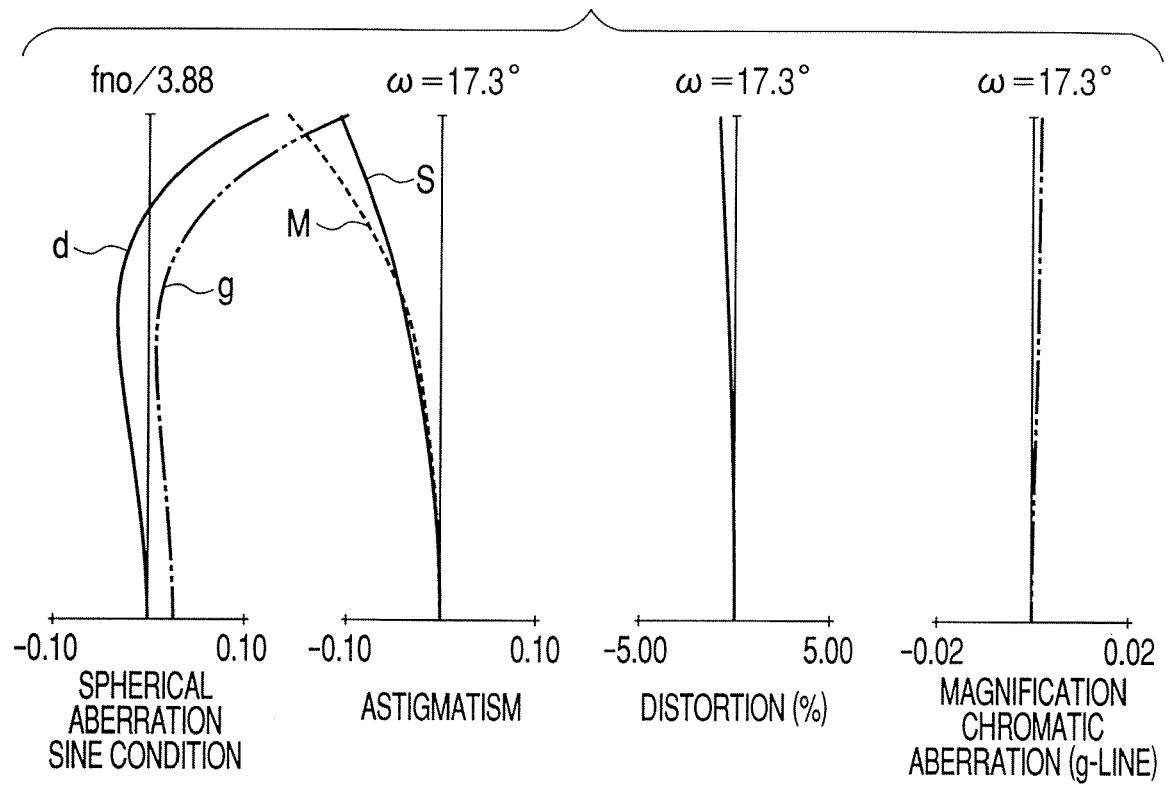
FIG. 7 shows the aberrations of the zoom lens according to Embodiment 2 at the intermediate zoom position.
Figure 8:
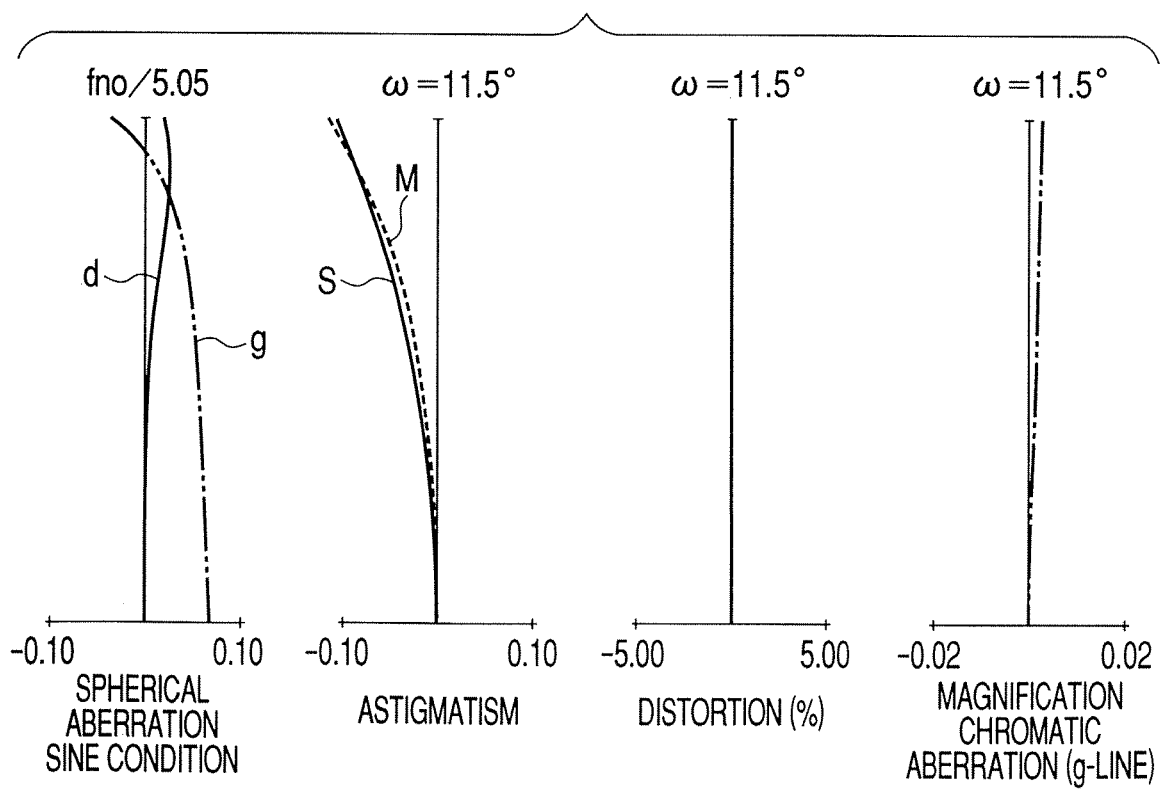
FIG. 8 shows the aberrations of the zoom lens according to Embodiment 2 at the telephoto end.

FIG. 5 is a lens cross-sectional view of a zoom lens according to Embodiment 2 of the present invention at the wide angle end, and FIGS. 6, 7 and 8 show the aberration of the zoom lens according to Embodiment 2 at the wide angle end, the intermediate zoom position and the telephoto end, respectively. Embodiment 2 is a zoom lens of a variable power ratio of 3.0 and an aperture ratio of the order of 2.8-5.1.

Figure 9:
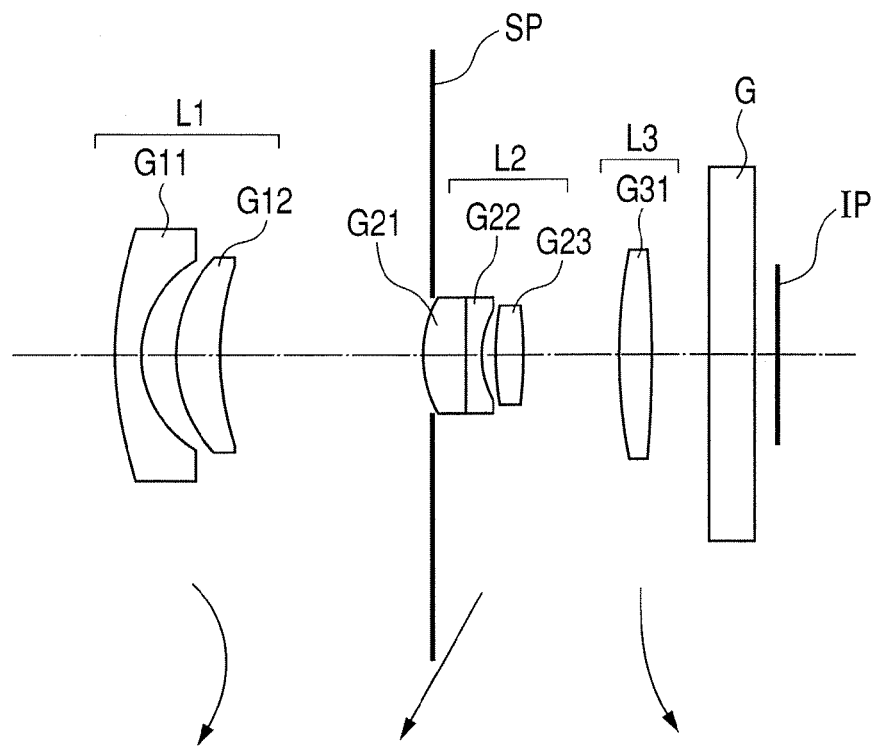
FIG. 9 is an optical cross-sectional view of a zoom lens according to Embodiment 3.
Figure 10:
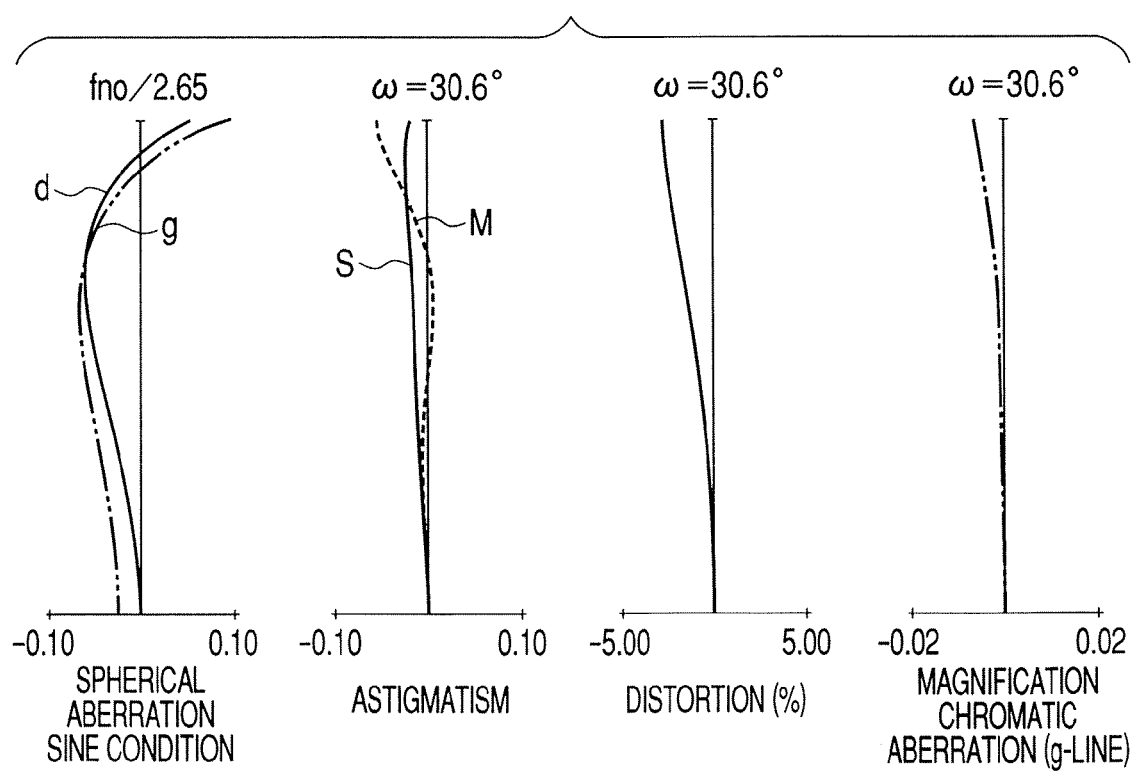
FIG. 10 shows the aberrations of the zoom lens according to Embodiment 3 at the wide angle end.
Figure 11:
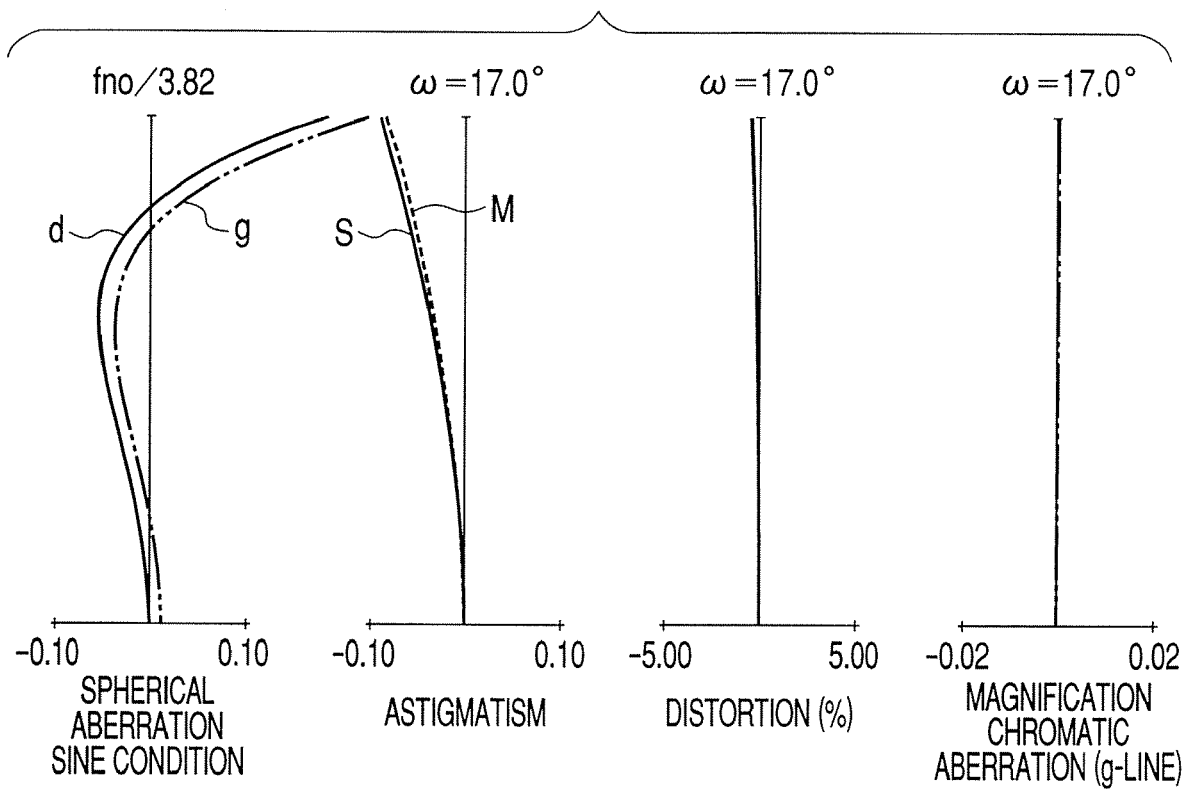
FIG. 11 shows the aberrations of the zoom lens according to Embodiment 3 at the intermediate zoom position.
Figure 12:
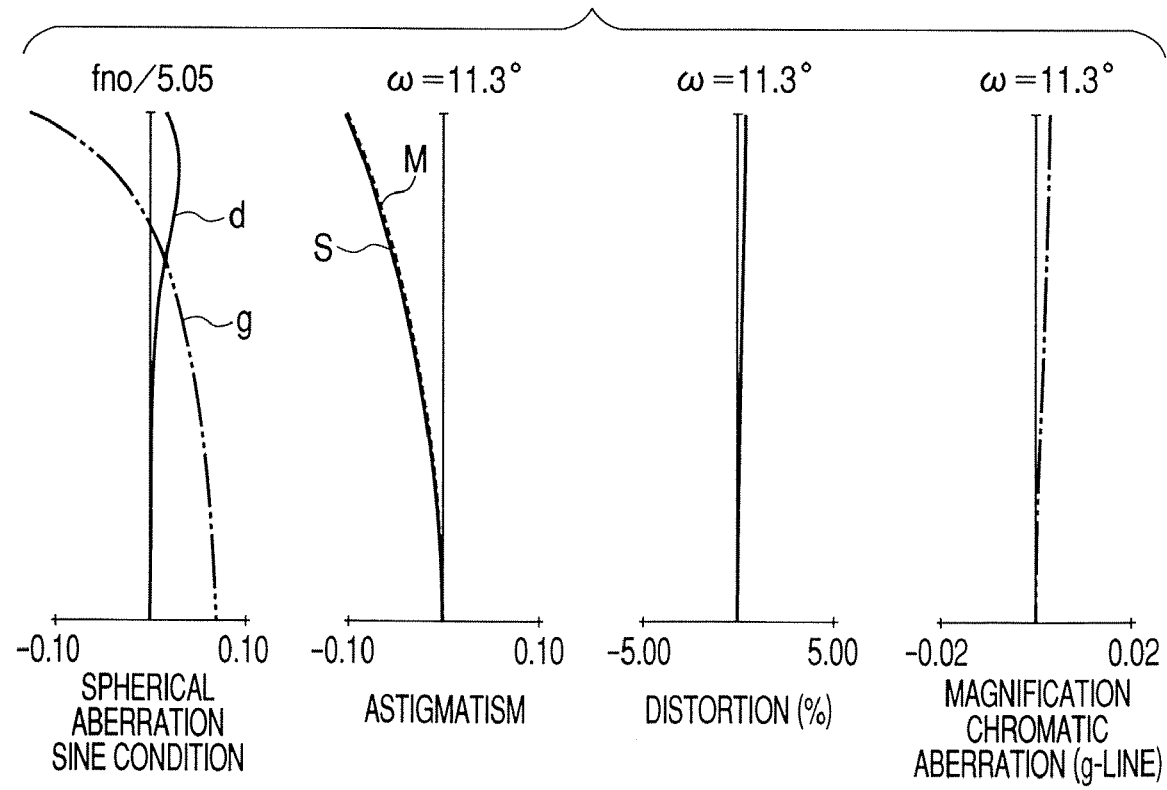
FIG. 12 shows the aberrations of the zoom lens according to Embodiment 3 at the telephoto end.

FIG. 9 is a lens cross-sectional view of a zoom lens according to Embodiment 3 of the present invention at the wide angle end, and FIGS. 10, 11 and 12 show the aberrations of the zoom lens according to Embodiment 3 at the wide angle end, the intermediate zoom position and the telephoto end, respectively. Embodiment 3 is a zoom lens of a variable power ratio of 3.0 and an aperture ratio of the order of 2.7-5.1.

Figure 13:
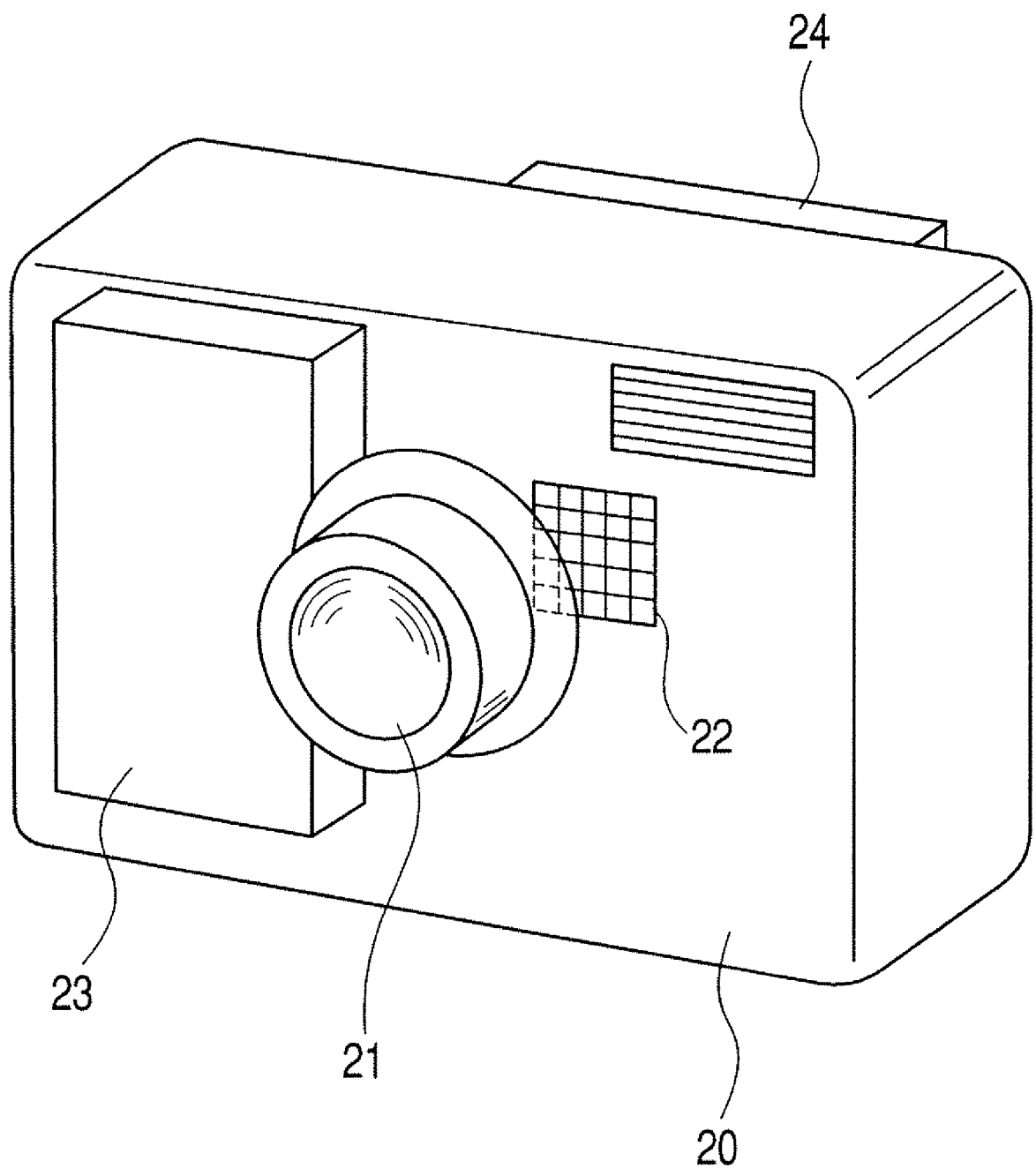
FIG. 13 is a schematic view of the essential portions of the image pickup apparatus of the present invention.

FIG. 13 is a schematic view of the essential portions of a digital camera (image pickup apparatus) provided with the zoom lens of the present invention.

The zoom lens according to each embodiment is a phototaking lens system used in the image pickup apparatus, and the left in the lens cross-sectional view is the object side (front) and the right is the image side (rear).

In the lens cross-sectional views of FIGS. 1, 5 and 9, the reference character L1 designates a first lens unit of negative optical power (optical power=the inverse number of a focal length), the reference character L2 denotes a second lens unit of positive optical power, the reference character L3 designates a third lens unit of positive optical power, and the reference character SP denotes an aperture stop, which is located on the object side of the second lens unit L2.

The letter G designates an optical block corresponding to an optical filter, a face plate, a rock crystal low-pass filter, an infrared cut filter or the like. The reference character IP denotes an image plane on which, when the zoom lens is used as the photo-taking optical system of a video camera or a digital still camera, there is placed the image pickup surface of a solid state image pickup element (photoelectric converting element) such as a CCD sensor or a CMOS sensor, and when the zoom lens is used as the photo-taking optical system of a camera for silver salt film, there is placed a photosensitive surface corresponding to a film surface.

In the aberration graphs, d and g represent d line and g line, respectively, M and S represent the meridional image plane and the sagittal image plane, respectively, and chromatic aberration of magnification is represented by g line.

In each of the following embodiments, the wide angle end and the telephoto end refer to the zoom positions when the lens unit for focal length change is positioned at the opposite ends of a range in which it is movable on the optical axis thereof in mechanism.

In the zoom lens according to each embodiment, in case of the zooming from the wide angle end to the zoom position at the telephoto end, the first lens unit L1 is reciprocally moved to the image side with a convex locus, the second lens unit L2 is moved to the object side, and the third lens unit L3 is moved to the image side.

The zoom lens according to each embodiment effects a main focal length change or a variation of power by the movement of the second lens unit L2, and corrects the movement of the image point resulting from the focal length change by the reciprocal movement of the first lens unit and the movement of the third lens unit toward the image side.

The third lens unit L3 bears its share of an increase in the optical power of a photo-taking lens resulting from the downsizing of the image pickup element, and decreases the optical power of a short zoom system constituted by the first lens unit L1 and the second lens unit L2 to thereby suppress particularly the occurrence of aberrations in each lens constituting the first lens unit L1 and achieve good optical performance.

Also, telecentric imaging on the image side particularly necessary for a photographing apparatus using a solid state image pickup element or the like is achieved by giving the role of a field lens to the third lens unit L3.

Also, the stop SP is placed on the object side of the second lens unit L2, and in case of zooming, it is moved with the second lens unit L2 to thereby shorten the distance between the incidence pupil on the wide angle side and the first lens unit L1. Thereby an increase in the outer diameters (effective diameters) of lenses constituting the first lens unit L1 and also is suppressed, and off-axial aberrations is negated by the first lens unit L1 and the third lens unit L3 with the stop SP disposed on the object side of the second lens unit L3 being interposed therebetween, whereby good optical performance is obtained without the number of constituent lenses being increased.

In the zoom lens according to each embodiment, the first lens unit L1 has two lenses, i.e., a lens G11 of negative optical power of which the object side surface is convex and having a meniscus shape, and a lens G12 of positive optical power of which the object side surface is convex and having a meniscus shape, the second lens unit L2 has, in succession from the object side to the image side, a cemented lens comprising a lens G21 of positive optical power of which the object side surface is convex and having a meniscus shape, and a lens G22 of negative optical power of which the image side surface is concave and having a meniscus shape, the lens G21 and the lens G22 being cemented together, and a lens G23 of positive optical power of which the object side and image side surfaces are of a convex shape, and the third lens unit L3 has at least one lens G31 of positive optical power.

In each embodiment, as described above, the optical power arrangement and lens construction of each lens unit are made particular to thereby keep good optical performance and yet, achieve the compactness of the lens system.

The features of the lens construction of each lens unit will now be described specifically.

The first lens unit L1 has the role of pupil-imaging an off-axial principal ray at the center of the stop SP, and particularly in a zoom area on the wide angle side, the amount of refraction of the off-axial principal ray is great and therefore, off-axial aberrations, particularly astigmatism and distortion are liable to occur.

So, in each embodiment, like an ordinary wide field angle lens, the first lens unit L1 is of a lens construction comprising the lens G11 of negative optical power and the lens G12 of positive optical power of a type which can suppress an increase in the lens diameter (effective diameter) most adjacent to the object side.

Also, the lens G11 is made into a meniscus shape and also, the object side lens surface thereof is made into an aspherical shape in which positive optical power becomes strong around the lens and the image side lens surface is made into an aspherical shape in which negative optical power becomes weak in the periphery of the lens, whereby astigmatism and distortion are well-balancedly corrected and also, the first lens unit L1 is constituted by a small number of lenses, i.e., two lenses, thus contributing to the compactness of the entire lens.

Also, each of the lenses G11 and G12 constituting the first lens unit L assumes a shape approximate to a substantially concentric spherical surface centering around a point at which the stop SP and the optical axis intersect with each other in order to suppress the occurrence of off-axial aberrations caused by the refraction of the off-axial principal ray.

Next, the second lens unit L2 is of such a shape that the lens G21 of positive optical power of which the object side surface is convex and having a meniscus shape is disposed to thereby reduce the angle of refraction of the off-axial principal ray emerging from the first lens unit L1, and off-axial aberrations do not occur much.

Also, the lens G21 is a lens in which the height at which an on-axial ray passes is greatest, and a lens concerned in chiefly the correction of spherical aberration and coma.

So, in each embodiment, object side surface of the lens G21 is made into an aspherical shape in which positive optical power becomes weak in the periphery of the lens to thereby correct spherical aberration and coma well.

Next, the shape of the lens G22 cemented to the lens G21 is made into a concave shape in which the image side surface is concave to thereby cancel aberrations occurring on the object side surface of the lens G21.

Next, the third lens unit L3 is constituted by the lens G31 of which the object side and image side surfaces are of a convex shape, and also has the role as a field lens for making the image side telecentric.

Now, when the back focal length is defined as sk', and the focal length of the third lens unit L3 is defines as f3, and the imaging magnification of the third lens unit L3 is defined as β3, the relation that $$sk'=f3(1-\beta 3)$$

is materialized.

In the foregoing expression, $$0<\beta 3<1.0$$

Here, when in case of zooming from the wide angle end to a zoom position at the telephoto end, the third lens unit L3 is moved to the image side, the back focal length sk' decreases, and the imaging magnification β3 of the third lens unit L3 increases in the zoom area on the telephoto side.

Thereupon, as a result, the third lens unit L3 can bear its share of a focal length change and the amount of movement of the second lens unit L2 is decreased, and a space therefore can be saved, and this contributes the downsizing of the lens system.

When a short distance object is to be photographed by the use of the zoom lens according to each embodiment, the first lens unit L1 can be moved to the object side to thereby obtain good performance, but desirably the third lens unit L3 should be moved to the object side.

According to this, it becomes possible to prevent an increase in the diameter of the fore lens occurring when the first lens unit L1 disposed most adjacent to the object side is focused, and an increase in the load of an actuator caused by the first lens unit L1 having the greatest lens weight being moved and further, simply link the first lens unit L1 and the second lens unit L2 together by a cam or the like and more them during zooming, and the simplification of mechanical structure and an improvement in accuracy can be achieved.

Focusing may be effected by the third lens unit L3 only.

Also, when focusing is to be effected by the third lens unit L3, in case of zooming from the wide angle end to the zoom position at the telephoto end, the third lens unit L3 is moved to the image side, whereby at the telephoto end whereat the amount of movement of the lens unit moved for focusing is great, the third lens unit L3 can be disposed on the image plane side and therefore, it becomes possible to minimize all amount of movement of the third lens unit L3 which becomes necessary for zooming and focusing, whereby the compactness of the entire lens system is achieved.

In the zoom lens according to each embodiment, to obtain good optical performance or to achieve the downsizing of the entire lens system, design is made such that one or more of the following conditions are satisfied. Thereby, there is obtained an effect corresponding to each conditional expression.

When at a maximum height whereat the off-axial ray passes through the lens G11 at the zoom position at the wide angle end, the difference (Δsphere−Δasphere) between the sag amount Δsphere of the object side surface of the lens G11 from the paraxial radius of curvature thereof (the distance from a perpendicular from the surface vertex to the optical axis, and the sign thereof being positive for an amount measured in the direction of travel of light, and being negative for the converse thereof) and the sag amount Δasphere of the aspherical shape is defined as Sag1, and the difference between the sag amount of the image side surface of the lens G11 at the paraxial radius of curvature thereof and the sag amount of the aspherical shape is defined as Sag2, the condition that $$0.05 < |Sag1/Sag2| < 1.0 \quad (1)$$

is satisfied.

However, it is to be understood that the signs of the differences Sag1 and Sag2 are minus when the surface shape of the paraxial radius of curvature is more adjacent to the object side than the aspherical shape, and are plus in a case converse thereto.

That is, in the object side surface, in the case of a shape in which positive optical power strengthens away from the optical axis, the sign of Sag1 becomes a negative value, and in the image side surface, in the case of a shape in which negative optical power weakens away from the optical axis, the sign of Sag2 becomes a positive value.

If the lower limit value of conditional expression (1) is exceeded, the share of the correction of distortion in the aspherical shape of the object side surface of the lens G11 weakens, and along therewith, the share of the correction of distortion in the aspherical shape of the image side surface of the lens G11 strengthens, whereby the correction of curvature of image field particularly at the wide angle end becomes difficult, and this is not preferable.

Also, if the upper limit value of conditional expression (1) is exceeded, distortion and curvature of image field occurring in the first lens unit L1 becomes over-corrected, and the aberration correction as the entire zoom lens system becomes difficult, and this is not preferable.

More preferably, the range of the numerical value of conditional expression (1) may be as follows:

$$0.1 < |Sag1/Sag2| 0.7 \quad (1a)$$

Each of the lens G11 of the first lens unit L1 which is most adjacent to the object side and the lens G21 of the second lens unit L2 which is most adjacent to the object side is such that the object side or/and image side surfaces are of an aspherical shape, and when the refractive indices of the materials of these lenses G11 and G12 are defined as n1n and n2p, respectively, the conditions that $$1.85 < n1n \quad (2)$$

$$1.85 < n2p \quad (3)$$

are satisfied.

If the ranges of conditional expression (2) and conditional expression (3) are departed from, the radius of curvature of the surface of each lens must be made small in order to make Petzval sum into a constant value and therefore, to secure the interval between the lenses and the edge thickness of the lenses, the interval between the lenses must be widened and the thickness of the lenses must be increased, and to achieve the shortening of the full length of the lenses during the flushing of the barrel, it is not preferable.

When the focal length of the lens G11 of the first lens unit L1 which is disposed most adjacent to the object side is defined as f11, and the focal length of the lens G21 of the second lens unit L2 which is disposed most adjacent to the object side is defined as f21, the condition that $$-1.6 < f11/f21 < -0.8 \quad (4)$$

is satisfied.

Conditional expression (4) is intended to make the absolute values of the focal length f11 and the focal length f12 substantially equal to each other, and make Petzval sum assume a small value by making the materials of the two lenses G11 and G21 the same.

More preferably, the numerical values of conditional expression (4) may be set as follows:

$$-1.5 < f11/f21 < -0.9 \quad (4a)$$

When the focal length of the first lens unit L1 is defines as f1, and the focal length of the entire system at the zoom position at the wide angle end is defined as fw, the condition that $$-2.6 < f1/fw < -1.6 \quad (5)$$

is satisfied.

If the upper limit value of conditional expression (5) is exceeded, the full length of the lens of the optical system becomes short, but the focal length of the first lens unit L1 becomes short, whereby the aberration correction of the entire variable power area, and particularly the correction of distortion becomes difficult, and this is not preferable.

Also, if the lower limit value of conditional expression (5) is exceeded, the amount of movement of the first lens unit L1 during zooming increases and the full length of the lens of the optical system becomes great, and this is not preferable.

It is more preferable that the range of the numerical value of conditional expression (5) be as follows:

$$-2.4 < f1/fw < -1.8 \quad (5a)$$

When the focal length of the second lens unit L2 is defined as f2, and the focal length of the entire system at the zoom position at the wide angle end is defined as fw, the condition that $$1.2 < f2/fw < 2.0 \quad (6)$$

is satisfied.

If the upper limit value of conditional expression (6) is exceeded, the amount of movement of the second lens unit L2 during zooming increases and the full length of the optical system becomes great, and this is not preferable.

Also, if the lower limit value of conditional expression (6) is exceeded, the full length of the optical system becomes short, but the focal length of the second lens unit L2 becomes short, whereby the aberration correction of the entire variable power area becomes difficult, and this is not preferable.

More preferably, the range of the numerical value of conditional expression (6) may be as follows:

$$1.3 < f2/fw < 1.8 \quad (6a)$$

When the distance from the object side vertex of the lens of the first lens unit L1 which is disposed most adjacent to the object side to the image side vertex of the lens of the first lens unit L1 which is disposed most adjacent to the image side is defined as DL1, and the distance from the object side vertex of the lens of the second lens unit L2 which is disposed most adjacent to the object side to the image side vertex of the lens of the second lens unit L2 which is disposed most adjacent to the image side is defined as DL2, and the distance from the object side vertex of the lens of the third lens unit L3 which is disposed most adjacent to the object side to the image side vertex of the lens of the third lens unit L3 which is disposed most adjacent to the image side is defined as DL3, and the focal length of the entire system at the zoom position at the wide angle end is defined as fw, the condition that $$1.3 < (DL1+DL2+DL3)/fw < 2.0 \quad (7)$$

is satisfied.

Conditional expression (7) is for achieving the shortening of the full length of the optical system and the shortening of the full length of the lens during the flushing of the barrel.

If the upper limit value of conditional expression (7) is exceeded, the thickness of each lens becomes relatively great and therefore, it becomes difficult to shorten the full length of the flush barrel of the lens, and this is not preferable.

If the lower limit value of conditional expression (7) is exceeded, the thickness of each lens becomes small and it becomes possible to shorten the full length of the lens during the flushing of the barrel, but to make the thickness of each lens small, the curvature of each lens must be loosened and therefore, the focal length of each lens unit becomes great. If the focal length of each lens unit becomes great, the amount of movement resulting from the focal length change of each lens unit necessarily becomes great, whereby a cam cylinder for moving each lens unit becomes long, and even if the thickness of the lens becomes small, conversely the full length of the lens during the flushing of the barrel becomes great, and this is not preferable.

More preferably, the range of the numerical value of conditional expression (7) may be as follows:

$$1.5 < (DL1+DL2+DL3)/fw < 1.8 \quad (7a)$$

According to each embodiment, each element is set as described above, thereby achieving a zoom lens suitable particularly for a photo-taking system using a solid state image pickup element, compact with a small number of constituent lenses, suitable particularly as a flush barrel type zoom lens, and having excellent optical performance in which the variable power ratio is of the order of two to three times.

Also, according to each embodiment, an aspherical surface is effectively introduced into the lens units, and particularly the optical power of the first lens unit L1 and the second lens unit L2 is appropriately set to thereby effectively effect the correction of the off-axial aberrations, particularly astigmatism and distortion, and spherical aberration when a great aperture ratio is adopted.

In each of the above-described embodiments, the zoom lens can also be applied to a zoom type in which, in case of zooming, instead of the three lens units being moved, two lens units (e.g. the first and second lens units, or the first and third lens units, or the second and third lens units) are moved so that the interval between the lens units may change.

Also, a lens unit of small optical power may be added to the object side of the first lens unit L1 or/and the image side of the third lens unit L3.

The numerical examples of the present invention will now be shown. In each numerical example, i indicates the order of the surface from the object side, Ri indicates the radius of curvature of the ith lens surface, Di indicates the lens thickness and the air gap between the ith surface and the i+1th surface, and Ni and Vi indicate the refractive index and Abbe number, respectively, for d line.

Also, the two surfaces most adjacent to the image side are formed of a glass material such as a face plate. Also, k, B and D are aspherical shape, when the displacement in the direction of the optical axis at a height h from the optical axis is defined as X with the surface vertex as the reference, is represented by $$x=(h^2/R)/[1+\{1-(1+k)(h/R)^2\}^{1/2}]+Bh^4+Ch^6+Dh^8,$$

where R is the radius of curvature.

Also, "e-OX" means "$\times 10^{-X}$". f indicates the focal length, Fno indicates F number, and ω indicates a half angle of field. Also, the relation between each of the aforedescribed conditional expressions and each numerical example is shown in Table 1 below.

NUMERICAL EXAMPLE 1 f=5.95-17.06
R1=27.620
R2=4.710
R3=6.882
R4=15.357
R5=stop
R6=4.031
R7=14.306
R8=3.293
R9=12.095
R10=−16.863
R11=20.170
R12=−73.163
R13=∞
R14=∞
Fno=2.84-5.05
D1=1.20
D2=1.30
D3=1.95
D4=variable
D5=−0.50
D6=1.70
D7=0.60
D8=0.63
D9=1.30
D10=variable
D11=1.30
D12=variable
D13=1.90
2ω=61.6°-23.5°
N1=1.882997
N2=1.846660
N3=1.882997
N4=1.808095
N5=1.696797
N6=1.696797
N7=1.516330

V1=40.8
V2=23.9
V3=40.8
V4=22.8
V5=55.5
V6=55.5
V7=64.1

| D/f | 5.95 | 14.51 | 17.06 |
|---|---|---|---|
| D4 | 11.70 | 2.04 | 0.91 |
| D10 | 4.57 | 13.54 | 15.74 |
| D12 | 2.50 | 1.19 | 1.15 |

Aspherical Surface Coefficients
R1 k=0.00000e+00
R2 k=−1.59793e+00
R6 k=−2.87748e−01
B=1.61680e−04
B=1.58635e−03
B=−7.69444e−05
C=−2.27651e−06
C=9.56045e−07
C=−1.29351e−06
D=2.40573e−08
D=2.10463e−07

NUMERICAL EXAMPLE 2 f=5.80-17.41
R1=25.230
Fno=2.75-5.05
D1=1.30
2ω=62.9°-23.1°
N1=1.860000
V1=41.0
R2=4.416
R3=6.152
R4=11.714
R5=stop
R6=4.045
R7=195.838
R8=3.379
R9=12.030
R10=−14.496
R11=18.026
R12=−108.204
R13=∞
R14=∞
D2=1.20
D3=2.00
D4=variable
D5=−0.45
D6=1.70
D7=0.60
D8=0.64
D9=1.30
D10=variable
D11=1.25
D12=variable
D13=1.90
N2=1.846660
N3=1.860000
N4=1.805181
N5=1.696797
N6=1.603112

N7=1.516330
V2=23.9
V3=41.0
V4=25.4
V5=55.5
V6=60.6
V7=64.1

| D/f | 5.80 | 14.74 | 17.41 |
|---|---|---|---|
| D4 | 10.79 | 1.80 | 0.84 |
| D10 | 4.12 | 13.54 | 15.94 |
| D12 | 2.63 | 1.35 | 1.25 |

Aspherical Surface Coefficients
R1 k=0.00000e+00
R2 k=−1.39250e+00
R6 k=−3.31345e−01
B=2.80275e−04
B=1.85779e−03
B=−3.39723e−05
C=−2.88598e−06
C=1.54737e−05
C=−6.42158e−06
D=1.46272e−08
D=4.32845e−07

NUMERICAL EXAMPLE 3 f=6.00-17.82
R1=12.441
R2=3.777
R3=5.769
R4=9.500
R5=stop
Fno=2.65-5.05
D1=1.20
D2=1.30
D3=1.80
D4=variable
D5=−0.45
2ω=61.2°-22.5°
N1=1.882997
N2=1.846660
V1=40.8
V2=23.9
R6=3.917
R7=102.584
R8=3.188
R9=11.097
R10=−15.021
R11=19.734
R12=−56.534
R13=∞
R14=∞
D6=1.80
D7=0.60
D8=0.60
D9=1.20
D10=variable
D11=1.30
D12=variable
D13=1.90
N3=1.882997
N4=1.805181
N5=1.696797

N6=1.696797
N7=1.516330
V3=40.8
V4=25.4
V5=55.5
V6=55.5
V7=64.1

| D/f | 6.00 | 15.07 | 17.82 |
| --- | --- | --- | --- |
| D4 | 8.72 | 1.54 | 0.72 |
| D10 | 3.91 | 13.71 | 16.19 |
| D12 | 2.38 | 0.94 | 0.82 |

Aspherical Surface Coefficients
R1 k=0.00000e+00
R2 k=−1.30721e+00
R6 k=−3.29927e−01
B=−4.72130e−04
B=1.37255e−03
B=−3.17633e−05
C=1.36909e−05
C=1.84274e−05
C=−1.88218e−05
D=−1.60809e−07
D=1.09018e−06

TABLE 1

| Conditional expression | | Lower limit | Upper limit | Embodiment 1 | Embodiment 2 | Embodiment 3 |
| --- | --- | --- | --- | --- | --- | --- |
| | Sag1 | | | −0.093 | −0.166 | 0.116 |
| | Sag2 | | | 0.315 | 0.258 | 0.617 |
| (1) | \|Sag1/Sag2\| | 0.05 | 1.0 | 0.296 | 0.642 | 0.187 |
| (2) | n1n | 1.85 | | 1.88300 | 1.86000 | 1.88300 |
| (3) | n2p | 1.85 | | 1.88300 | 1.86000 | 1.88300 |
| | f1 | | | −13.857 | −12.547 | −11.856 |
| | fw | | | 5.951 | 5.802 | 6.005 |
| (5) | f1/fw | −2.6 | −1.6 | −2.328 | −2.162 | −1.974 |
| | f2 | | | 9.689 | 9.113 | 8.531 |
| | fw | | | 5.951 | 5.802 | 6.005 |
| (6) | f2/fw | 1.2 | 2.0 | 1.628 | 1.571 | 1.421 |
| | DL1 | | | 4.450 | 4.500 | 4.300 |
| | DL2 | | | 4.229 | 4.237 | 4.197 |
| | DL3 | | | 1.300 | 1.250 | 1.300 |
| | fw | | | 5.951 | 5.802 | 6.005 |
| (7) | (DL1 + DL2 + DL3)/fw | 1.3 | 2.0 | 1.677 | 1.721 | 1.632 |
| | f11 | | | −6.593 | −6.409 | −6.568 |
| | f21 | | | 5.898 | 4.783 | 4.573 |
| (4) | f11/f21 | −1.6 | −0.8 | −1.118 | −1.340 | −1.436 |

Reference is now had to FIG. 13 to describe an embodiment of a digital still camera (image pickup apparatus) using the zoom lens of the present invention as a photo-taking optical system.

In FIG. 13, the reference numeral 20 designates a camera main body, the reference numeral 21 denotes a photo-taking optical system constituted by the zoom lens of the present invention, the reference numeral 22 designates a solid state image pickup element (photoelectric converting element) such as a CCD sensor or a CMOS sensor for receiving an object image formed by the photo-taking optical system 21, the reference numeral 23 denotes a memory for recording information corresponding to the object image photoelectrically converted by the image pickup element 22, and the reference numeral 24 is a viewfinder constituted by a liquid crystal display panel or the like for observing therethrough the object image formed on the solid state image pickup element 22.

The zoom lens of the present invention is thus applied to an image pickup apparatus such as a digital still camera to thereby realize a compact image pickup apparatus having high optical performance.

This application claims priority from Japanese Patent Application No. 2004-046453 filed Feb. 23, 2004, which is hereby incorporated by reference herein.

The invention claimed is:

1. A zoom lens having in succession from an object side to an image side:
    a first lens unit of negative optical power, at least one of the object side and image side surfaces of a lens element of said first lens unit which is most adjacent to the object side is of an aspherical shape;
    a second lens unit of positive optical power, at least one of the object side and image side surfaces of a lens element of said second lens unit which is most adjacent to the object side is of an aspherical shape; and
    a third lens unit of positive optical power;
    wherein an interval between adjacent ones of said lens units changes in case of zooming, and when the refractive indices of the materials of said lens element of said first lens unit and said lens element of said second lens unit are defines as n1n and n2p, respectively, the following conditions are satisfied:

$1.85 < n1n$ $1.85 < n2p.$

2. A zoom lens according to claim 1, wherein the materials of said lens element of said first lens unit and said lens element of said second lens unit are the same.

3. A zoom lens according to claim 1, wherein in succession from the object side to the image side, said first lens unit consists of a lens element of said first lens unit, of negative optical power of which the object side surface is convex and having a meniscus shape, and a lens element of said second lens unit, of positive optical power of which the object side surface is convex and having a meniscus shape.

4. A zoom lens according to claim 1, wherein in succession from the object side to the image side, said second lens unit consists of a cemented lens comprising lens element of positive optical power and a lens element of negative optical power cemented together, and a lens element of which the object side and image side surfaces are of a convex shape.

5. A zoom lens according to claim 1, wherein when a focal length of said first lens unit is defined as f1, and the focal length of an entire system at a zoom position at a wide angle end is defined as fw, the following condition is satisfied:

$-2.6 < f1/fw < -1.6.$

6. A zoom lens according to claim 1, wherein when a focal length of said second lens unit is defined as f2, and the focal length of an entire system at a zoom position at a wide angle end is defined as fw, the following condition is satisfied:

$1.2 < f2/fw < 2.0.$

7. A zoom lens according to claim 1, wherein when a distance from an object side vertex of the lens element of said first lens unit which is disposed most adjacent to the object side to an image side vertex of the lens element of said first lens unit which is disposed most adjacent to the image side is defined as DL1, and the distance from the object side vertex of the lens element of said second lens unit which is disposed most adjacent to the object side to the image side vertex of the lens element of said second lens unit which is disposed most adjacent to the image side is defined as DL2, and the distance from the object side vertex of the lens element of said third lens unit which is disposed most adjacent to the object side to the image side vertex of the lens element of said third lens unit which is disposed most adjacent to the image side is defined as DL3, and a focal length of an entire system at a zoom position at a wide angle end is defined as fw, the following condition is satisfied:

$$1.3<(DL1DL2DL3)/fw<2.0.$$

8. A zoom lens according to claim 1, wherein when a focal length of the lens element of said first lens unit which is located most adjacent to the object side is defined as f11, and the focal length of the lens element of said second lens unit which is located most adjacent to the object side is defined as f21, the following condition is satisfied:

$$-1.6<f11/f21<-0.8.$$

9. A zoom lens according to claim 1, which forms an image on an image pickup element.

10. An image pickup apparatus comprising:

a zoom lens according to claim 1; and a solid state image pickup element for receiving an image formed by said zoom lens.

* * * * *